United States Patent [19]

Nakagawa et al.

[11] Patent Number: 5,043,719
[45] Date of Patent: Aug. 27, 1991

[54] MATRIX CIRCUIT

[75] Inventors: Katsumi Nakagawa, Kawasaki; Toshiyuki Komatsu, Yamato; Shinichi Seito, Isehara; Yasuo Kuroda, Sagamihara; Katsunori Hatanaka, Yokohama, all of Japan

[73] Assignee: Canon Kabushiki Kaisha, Tokyo, Japan

[21] Appl. No.: 630,778

[22] Filed: Dec. 21, 1990

Related U.S. Application Data

[63] Continuation of Ser. No. 462,339, Jan. 2, 1990, abandoned, which is a continuation of Ser. No. 284,856, Dec. 13, 1988, abandoned, which is a continuation of Ser. No. 902,087, Aug. 27, 1986, abandoned, which is a continuation of Ser. No. 757,670, Jul. 22, 1985, abandoned.

[30] Foreign Application Priority Data

Jul. 31, 1984 [JP] Japan .................... 59-158660

[51] Int. Cl.$^5$ .................... H04Q 3/42; H04N 1/04
[52] U.S. Cl. .................... 340/825.79; 340/825.81; 340/784; 358/213.11
[58] Field of Search ............ 340/825.79, 825.8, 825.81, 340/825.85, 825.88, 825.94, 771, 776, 784; 350/333, 335; 357/32; 250/578; 358/213.11

[56] References Cited

U.S. PATENT DOCUMENTS

| 3,824,580 | 7/1974 | Bringol | 340/825.79 |
|---|---|---|---|
| 4,020,293 | 4/1977 | Ashley | 340/825.79 |
| 4,044,345 | 8/1977 | Ueda | 340/825.81 |
| 4,453,187 | 6/1984 | Komiya et al. | 358/213.11 |

FOREIGN PATENT DOCUMENTS

| 0113840 | 7/1984 | European Pat. Off. |  |
|---|---|---|---|
| 3223840 | 1/1983 | Fed. Rep. of Germany . |  |
| 3442605 | 5/1985 | Fed. Rep. of Germany . |  |
| 2508746 | 12/1982 | France . |  |
| 2134686 | 8/1984 | United Kingdom | 340/784 |
| 2151874 | 7/1985 | United Kingdom . |  |

OTHER PUBLICATIONS

Lynch, R. J., "Solid State Electroluminescent Display and Scanning Apparatus." *IBM Technical Disclosure Bulletin*, vol. 9, No. 12, May 1967, pp. 1799–1801.

Primary Examiner—Douglas W. Olms
Assistant Examiner—Ralph E. Smith
Attorney, Agent, or Firm—Fitzpatrick, Cella, Harper & Scinto

[57] ABSTRACT

A matrix circuit has a plurality of blocks each including a plurality of semiconductor unit elements, the semiconductor unit elements of each block being adapted to be impressed with a predetermined voltage at the same time, each unit element becoming active when impressed with the predetermined voltage, and a drive device for impressing the predetermined voltage to the plurality of blocks sequentially. The matrix circuit includes a first selective device for selecting either ground or a desired other than ground voltage, and a second selective device for selecting one of the output of the drive device and the output of the first selective device whereby the output of the second selective device renders active the plurality of unit elements of each block.

10 Claims, 15 Drawing Sheets

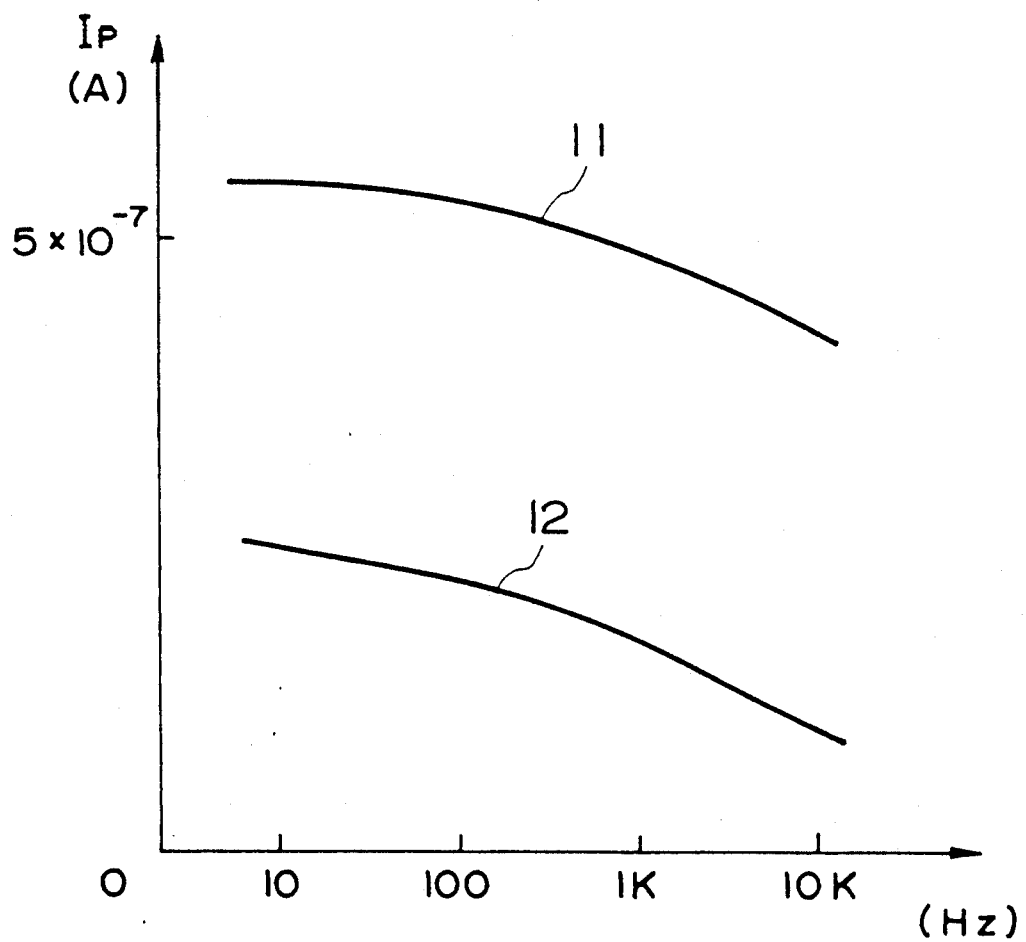
F I G. 5

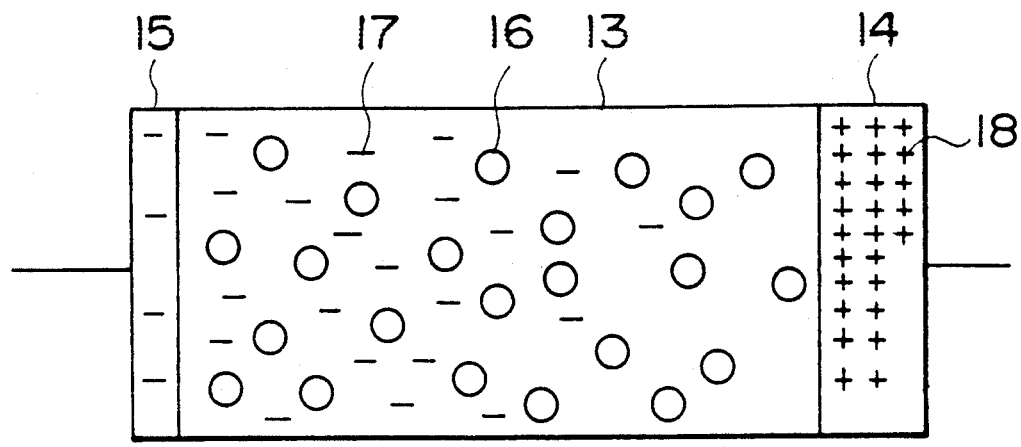
F I G. 6A
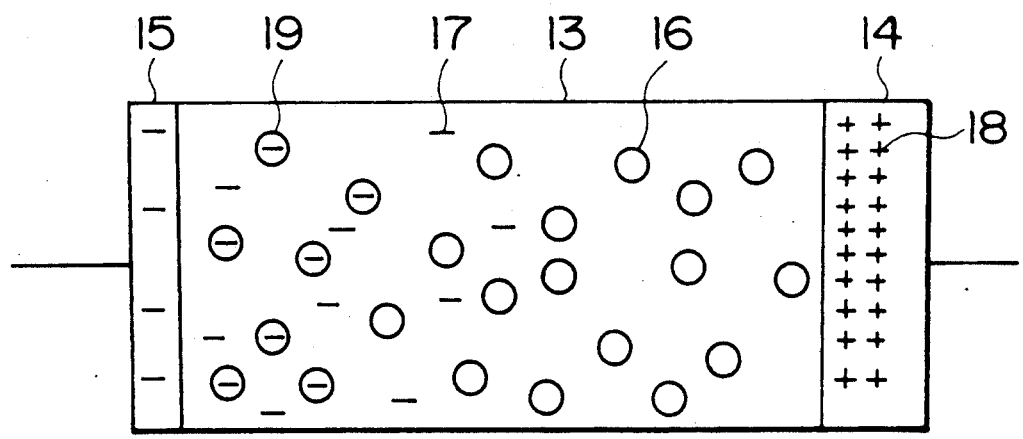
F I G. 6B

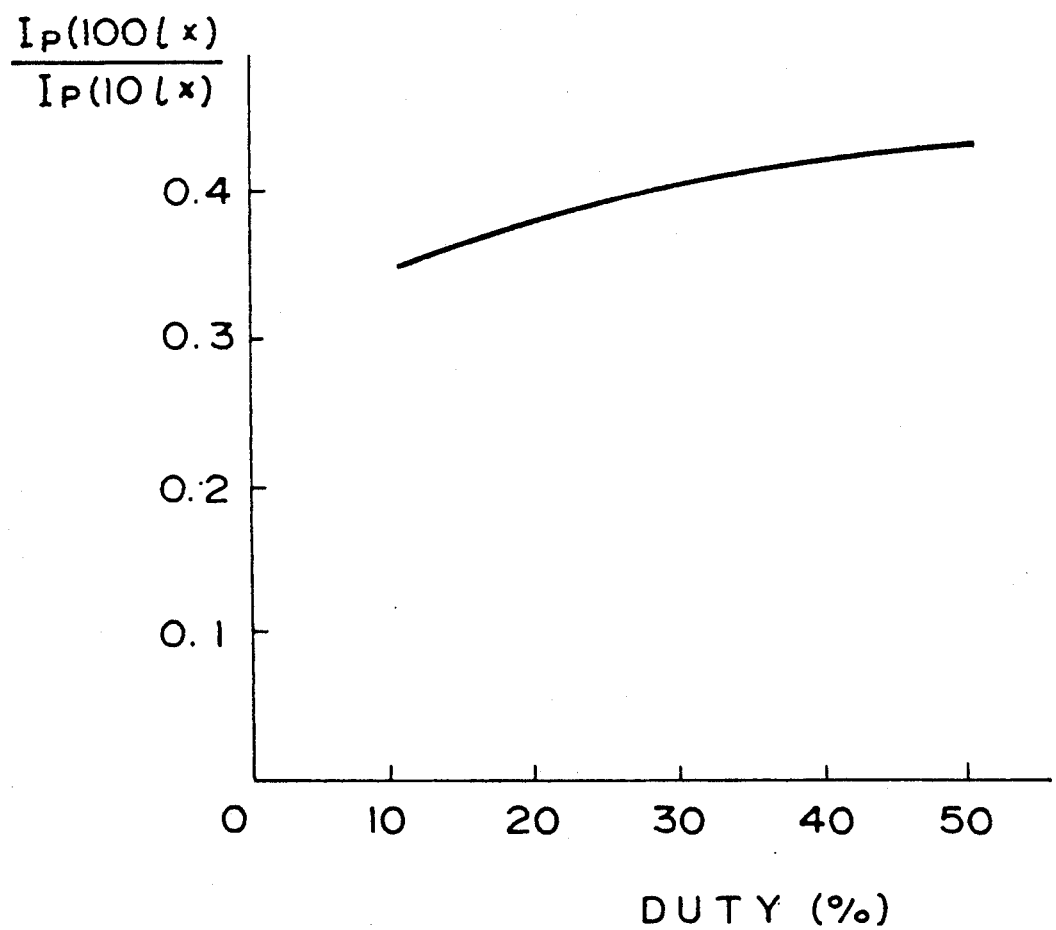
F I G. 8

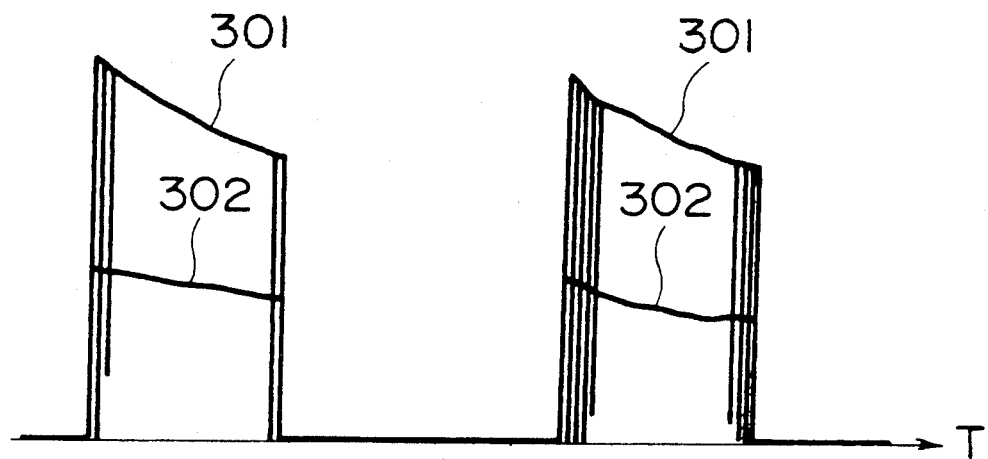
F I G. 12A
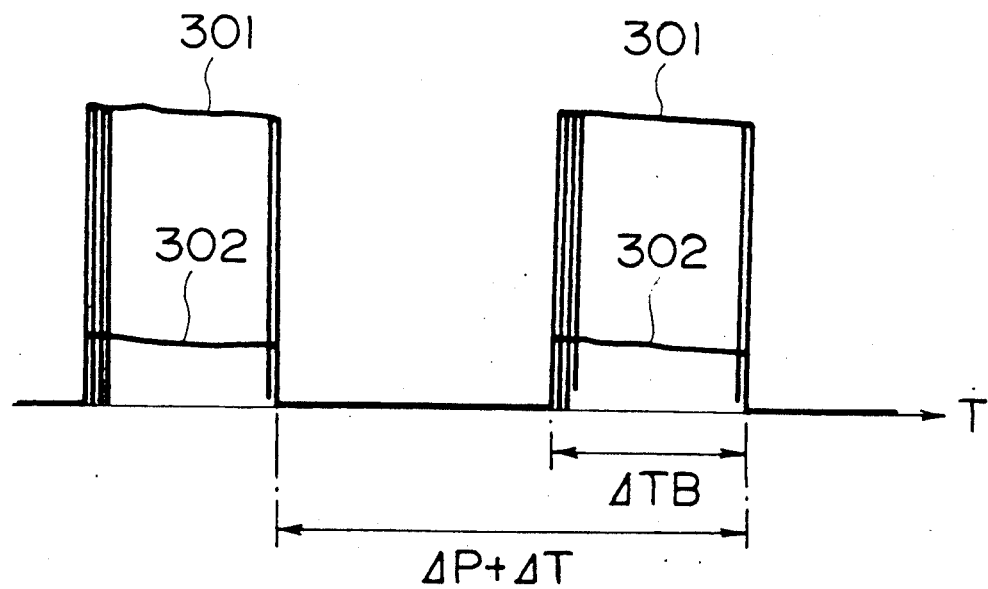
F I G. 12B

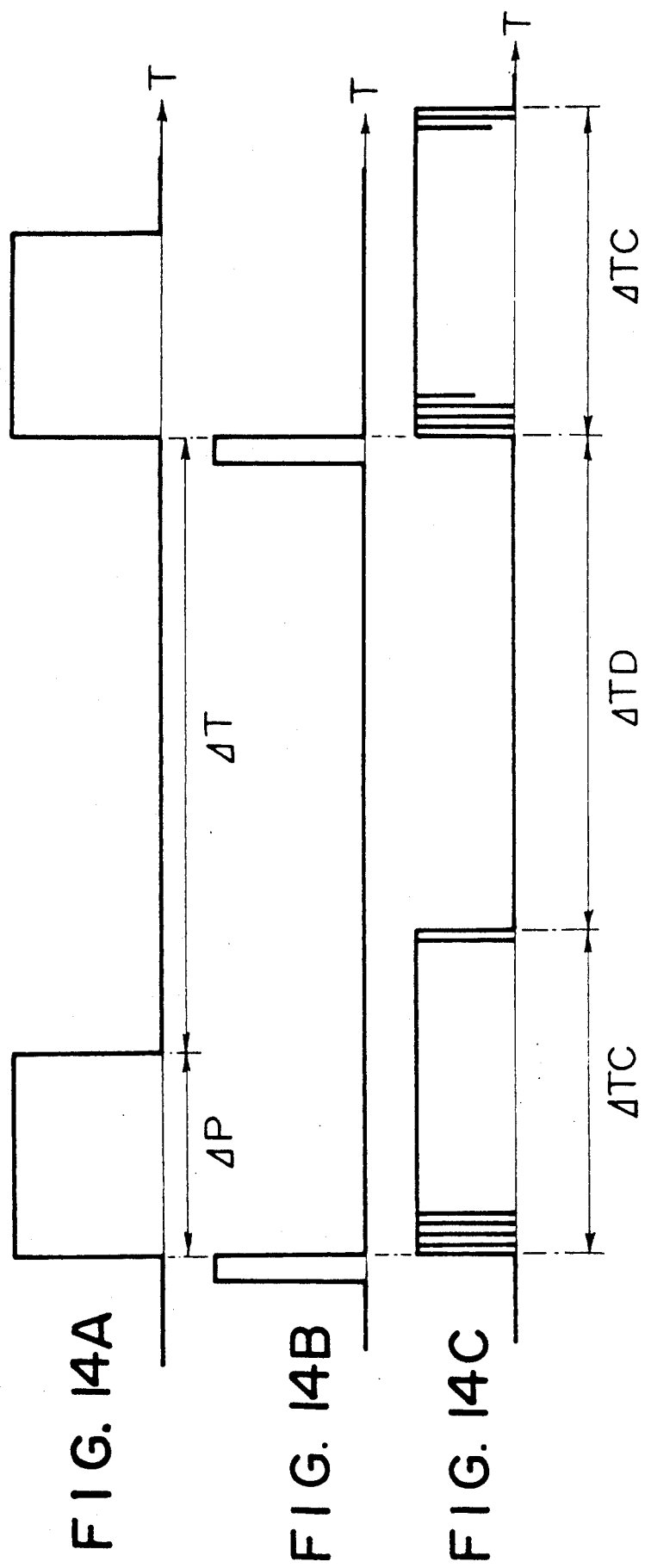

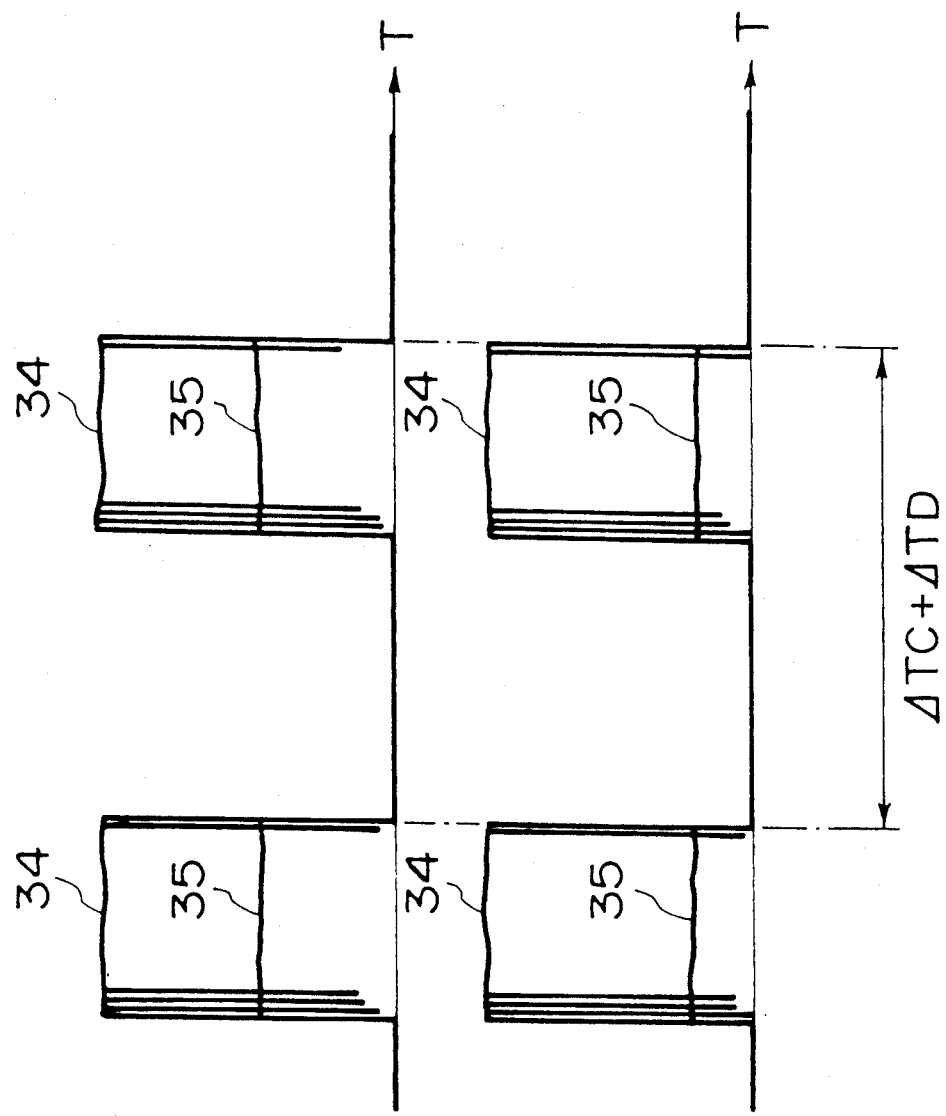

MATRIX CIRCUIT

This application is a continuation of application Ser. No. 07/462,339 filed Jan. 2, 1990, now abandoned, which is a continuation of application Ser. No. 07/284,856 filed Dec. 13, 1988, now abandoned, which is a continuation of application Ser. No. 06/902,087 filed Aug. 27, 1986, now abandoned, which is a continuation of original application Ser. No. 06/757,670 filed on July 22, 1985, now abandoned.

BACKGROUND OF THE INVENTION

1. Field of the Invention

The present invention relates to matrix circuits using thin film semiconductors, and more particularly, to matrix circuits in read or display devices.

2. Description of the Prior Art

Recently, two-dimensional liquid crystal displays and strip image sensors for facsimile devices have been constructed using thin film semiconductors of amorphous silicon hydride (a-Si:H) or sintered cadmium sulfide cadmium selenide (CdS-CdSe).

A thin film semiconductor can be deposited readily onto a transparent substrate by glow discharge, reactive sputtering or evaporation methods. It can then be processed into an array of photodiodes, photoconductive type photosensors, field effect transistors, or the like. Thus, inexpensive strip, large-area read or display devices can be formed which have not been realized with conventional crystal semiconductors.

Usually, matrix circuits are used in read and display devices for the purpose of simplification and two-dimensional formation of the circuits. The case of strip image sensors will be considered and the matrix circuits thereof will be described.

FIGS. 1 and 2 show matrix circuits of strip image sensors. Both in FIGS. 1 and 2, n (n=4 in FIGS. 1 and 2) unit elements e of a thin film semiconductor are connected so as to form a block. M such blocks are connected to form an array. For the sake of description, a unit element will be described hereinafter as $e_{ij}$ where the subscript i is the number of the block to which the unit element belongs and the subscript j is the number of the order of the unit element in the block. Thus $1 =< i =< m$, and $1 =< j =< n$.

In FIG. 1, the terminals on one side of the unit elements in each block are connected together. The terminals on the other side of unit elements ($e_{i1}-e_{i4}$; $1 \leq i \leq 4$) having the same subscript j in the respective blocks are connected to a corresponding one of lines $l_1-l_4$ which are in turn connected to corresponding arrays of switches 1-4 and are selectively connected to ground or an input terminal of an amplifier 5 depending upon the operation of switches 1-4.

Respective unit elements e in each block are impressed with a voltage Vi (i is a block number such that $1 \leq i \leq m$) at which time block unit elements $e_{i1}-e_{i4}$ become active. Since an image sensor is used here as an example, respective electric currents, corresponding to the intensity of incident rays, flow through corresponding active unit elements $e_{i1}-e_{i4}$. The currents are sequentially input to and amplified by amplifier 5 depending upon the operation of the switch array. Voltages $V_1-V_m$ are sequentially applied, as shown in the timing chart of FIG. 3, so that currents flowing through all of the elements e corresponding to the intensity of incident rays are sequentially input to amplifier 5.

In the matrix circuit of FIG. 2, lines $I_1-I_4$ are connected to the respective inputs of amplifiers 6, the outputs of which are connected to the respective inputs of allotment areas of a shift register 10 which outputs its storage contents sequentially as a time series signal each time a shift pulse (not shown) is input thereto. Since voltages $V_1-V_m$ are applied as shown in FIG. 3, currents corresponding to the intensity of incident rays are obtained from all of the unit elements e of the array in the matrix of FIG. 2 as in the matrix circuit of FIG. 1.

In order to end the operation of the entire array of units elements $e_{ij}$ in $T_a$ seconds, each unit element $e_{ij}$ must come into a normal operational state at latest $T_a/m$ seconds by calculation after the voltage $V_i$ is applied. For example, when $T_a$-10 msec, and m =64, $T_a/m$ =156 μsec. Although each unit element is given $T_a/m$ =156 μsec by calculation, it can actually only have a leeway of about 50 μsec due to various restrictions.

FIGS. 4A-4C each are graphs of current, as a function of time, flowing through a 10 μm-long gapped coplanar photoelectric type photosensor having an ohmic contact electrode at an n$^{-layer\ as\ a\ unit\ element\ e_{ij}}$ directly after the photosensor is impressed with a voltage of 10 V. In the graphs, the axis of abscissas denotes time (μsec) and the axis of ordinates denotes current (A).

FIGS. 4A, 4B and 4C relate to the current-time relationship at illuminances of 100(lx), 10(lx) and darkness, respectively.

As is obvious from these graphs, a great current flows directly after application of the voltage of 10 V, but after elapse of 200 μsec, the current subsides to a steady state. In the cases of 10(lx) (FIG. 4B) and the dark state (FIG. 4C), the current, flowing directly after the voltage application, is considerably large compared with the steady-state current. Thus, it will be understood that in the steady-state, the current in the case of 100(lx) is about 5 times as large as that in the case of 10(lx) whereas directly after the voltage application, the former current is only 2.3 times as large as the latter current, thereby rendering it difficult to discriminate between the light intensities. It follows that the conventional image sensors are likely to read documents erroneously.

In order to eliminate these problems, a method has been considered which includes the steps of either prolonging the operating time $T_a$ of the entire array of unit elements $e_{ij}$ or increasing the number n of unit elements and increasing the number of switches 1-4 in FIG. 1 or increasing the number of amplifiers 6-9 in FIG. 2.

However, such a method lowers the performance of the image sensors as a device and raises the cost of the sensors. Thus, such a method is not acceptable.

SUMMARY OF THE INVENTION

The present invention has been made in view of the above problems. An object of the present invention is to provide an inexpensive high-speed matrix circuit which is unlikely to function erroneously.

Another object of the present invention is to provide a matrix circuit which includes:

first selective means for selecting either ground level and a desired voltage other than ground level; and second selective means for enabling one of the plurality of semiconductor elements in a respective block which is connected output of a drive means which applies a predetermined voltage to each of the blocks, and the output of the first selective means;

the desired voltage being applied to the block during a time interval before a predetermined voltage is applied to any one block and when no predetermined voltage is applied to the other blocks.

BRIEF DESCRIPTION OF THE DRAWINGS

FIG. 4 illustrates the time characteristic of a photocurrent flowing through a thin film semiconductor (TFT)

FIG. 5/is a diagram of the photocurrent-frequency characteristic curve of a thin film semiconductor;

FIG. 6A illustrates a typical initial state of a semiconductor occurring when a voltage is applied thereto;

FIG. 6B illustrates a typical steady state of the semiconductor;

FIG. 8 illustrates a curve of the characteristics of a light intensity dependency ratio with the duty factor of a repetition pulse;

FIG. 12A illustrates a waveform of the output signal of the conventional matrix circuit;

FIG. 12B illustrates a waveform of the output signal from the embodiment;

FIGS. 14A to 14C illustrate waveforms of pulse signals $S_1$, $S_3$ and $S_4$;

FIG. 15A illustrates a waveform of the output signal from the conventional matrix circuit of FIG. 2; and FIG. 15B illustrates a waveform of the output signal from the embodiment of FIG. 13.

DETAILED DESCRIPTION OF THE PREFERRED EMBODIMENTS

Figure 1:
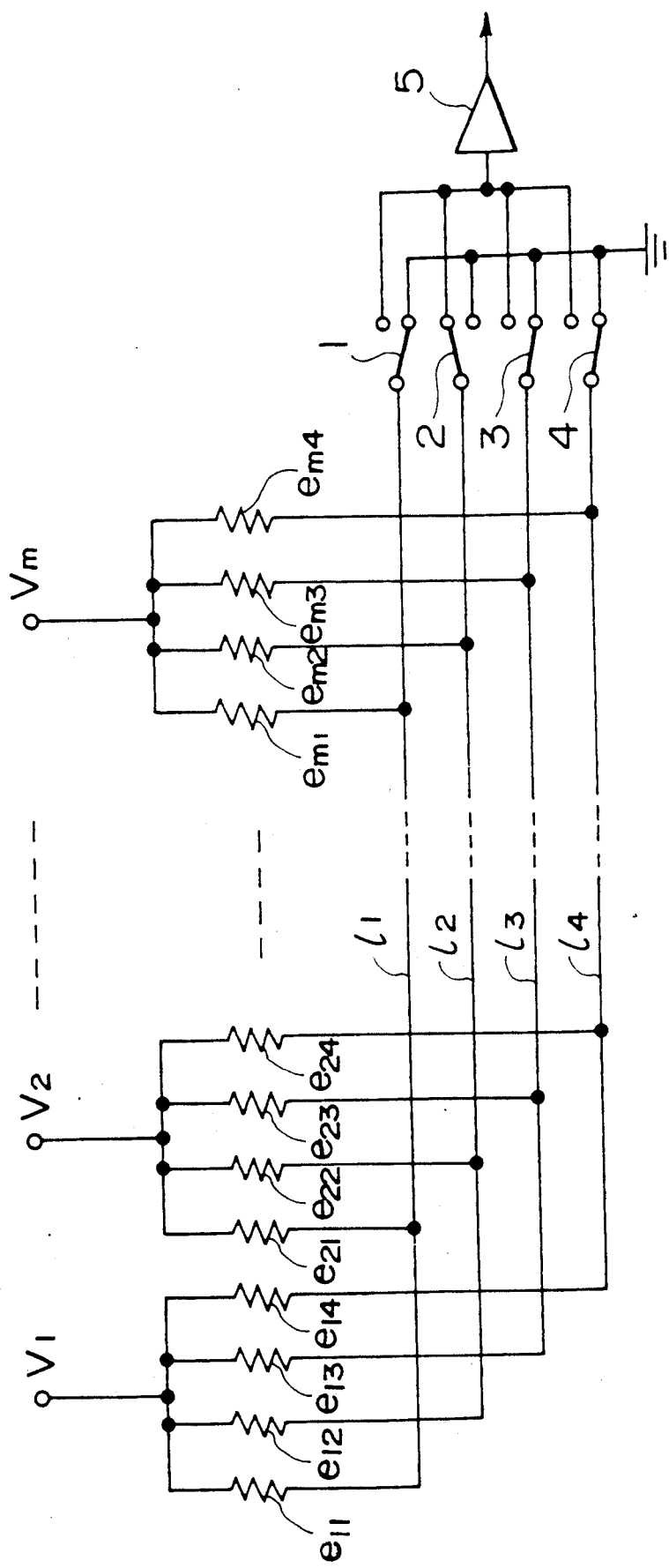
FIG. 1 is a schematic circuit diagram of a first example of a conventional matrix circuit.

Initially, the theoretical base on which the present invention relies to attain the objects of the invention will be described.

FIG. 5 is a graph of a pulse frequency dependency of a unit element current $I_p$, measured 50 $\mu$sec after the rise of a pulse of a repetitive pulse voltage (In this case, the voltage is 10 V, the pulse duty factor is 50%.) which is applied to a thin-film semiconductor unit element. A curve 11 denotes the measured pulse frequency dependency at an illuminance of $100(1\times)$ and a curve 12 denotes the measured frequency dependency at an illuminance of $10(1\times)$.

As will be understood from these graphs, both in the case of $100(1x)$ and in the case of $10(1x)$, as the frequency of the repetitive pulse signal increases, the current $I_p$ tends to decrease; especially, in the case of $10(1\times)$, the decrease in $I_p$ is great. Thus, in the area of high frequencies, current $I_p$ in the case of $10(1\times)$ is about 4.3 times as large as $I_p$ in the case of $100(1\times)$ and close to the value of $I_p$ (about 5 times as large as $I_p$ in the case of $100(1\times)$) in the steady state. The theory underlying this phenomenon will be discussed below.

When a strong electric field is applied to a relatively high-resistance semiconductor via electrodes provided thereto, carriers (for example, electrons) are generally injected from the electrodes and thus a space charge is formed within the semiconductor. The current flowing through the semiconductor is determined by this space charge. This current is referred to as space charge limited current and referred to as SCLC hereinafter. In the steady state, the magnitude I of SCLC is given by:

$$I = KV^2\theta\mu/4\pi L^3 \times 10 \ (A/cm^2) \tag{1}$$

where K is a permittivity, V is a applied voltage $\mu$ is the mobility of the semiconductor, L is an inter-electrode distance and $\theta$ is the ratio $(N_c/N_t)$ of a carrier density $N_c$ in the conduction band of the semiconductor to a carrier density $N_t$ at a shallow trap level thereof where the carriers each form a recombination center.

However, the state of the semiconductor immediately after the electric field has been applied thereto is not the steady state thereof and the carriers injected through the electrodes have hardly fallen into the trap level. This initial state is typically illustrated in FIG. 6A.

In FIG. 6A, a voltage has just been applied across semiconductor 13, i.e. between the plus and minus electrode sides 14, 15 thereof, and many holes 18 are being produced on the plus electrode side 14. There is a shallow trap level 16 in semiconductor 13, but electrons 17 injected from minus electrode 15 have not yet fallen into level 16 in this initial state.

Since, in this initial state, $C_c$ is large compare with $N_t$, the value of e is large and hence SCLC is large.

As time elapses, however, disappearance of the electrons 17 and holes 18 takes place due to their combination, and the supply of carriers from the electrodes approaches equilibrium. At the same time, electrons 17 falls into trap 16 (state 19) or are again excited from level 16 back to the conduction band and thus the electron density in the conduction band and that in trap level 16 approaches equilibrium. Therefore, the value of e approaches a fixed value which is small compared with its initial value and SCLC also approaches a fixed value which is small compared with its initial value. This theory explains the phenomenon that any of the graphs of FIGS. 4A and 4B shows a large initial current value which gradually subsides to a steady-state value.

Figure 4A:
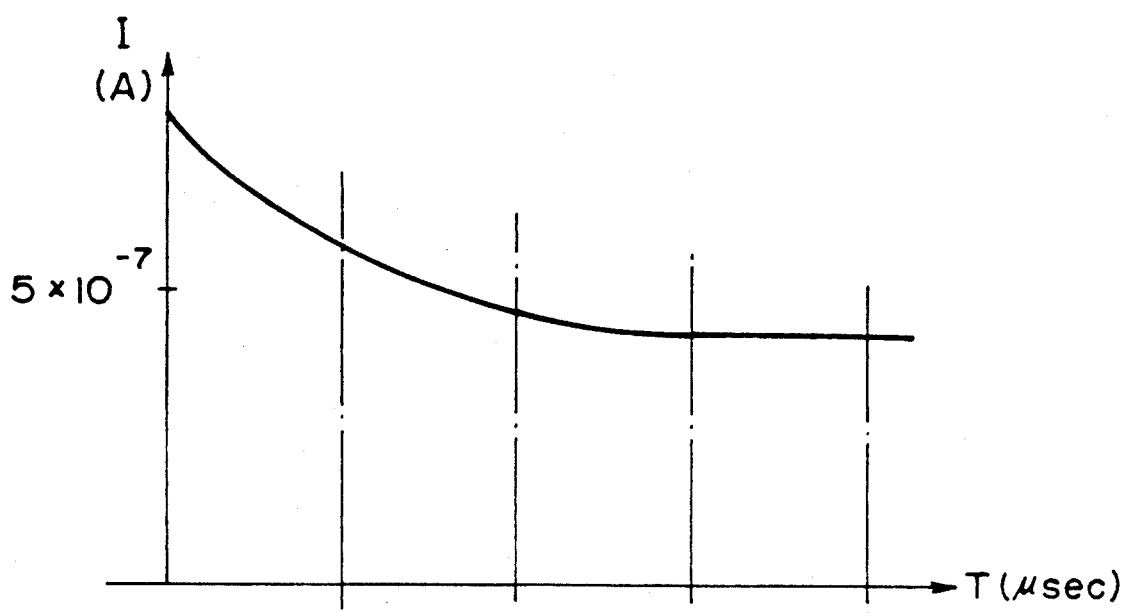
FIG. 4A is a diagram of a characteristic curve derived at an illuminance of $100(1\times)$.
Figure 4B:
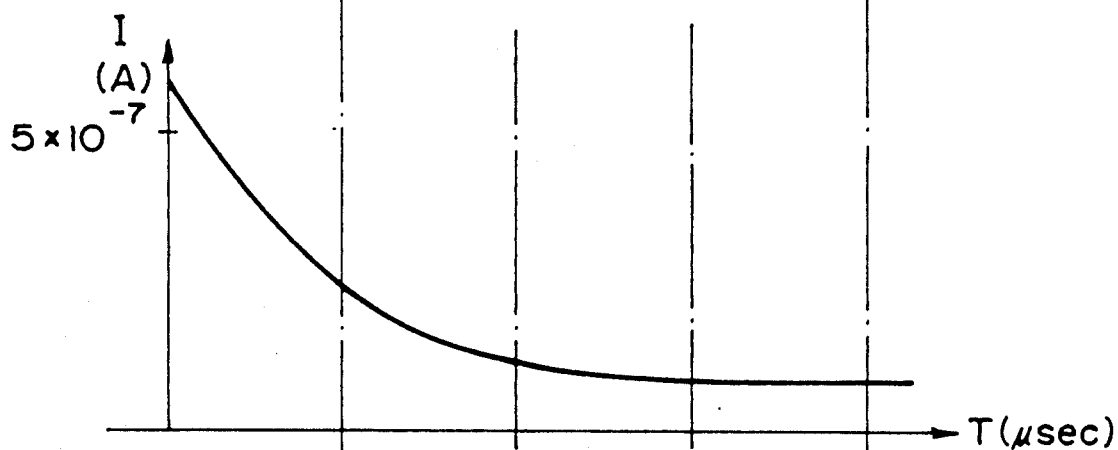
FIG. 4B is a diagram of a characteristic curve at an illuminance of $10(1\times)$ and FIG. 4C is a diagram of a characteristic curve derived at a dark state.
Figure 4C:
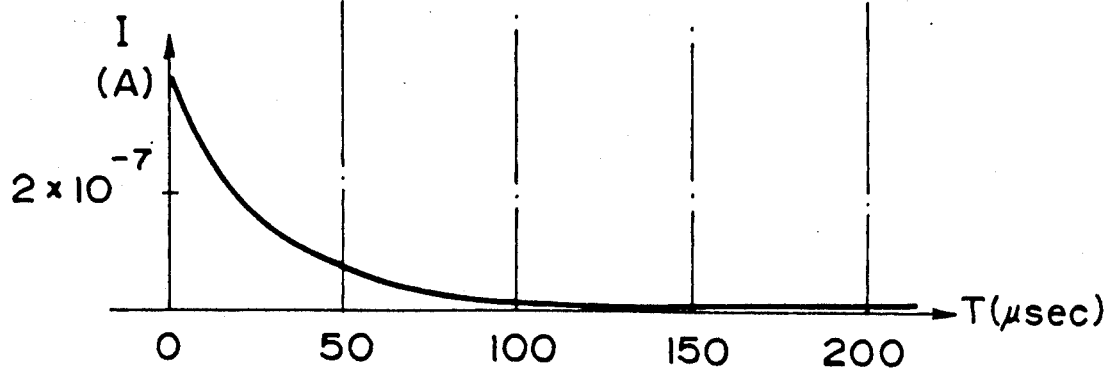

In the cases of FIGS. 4A and 4B, i.e. when the semiconductor is being irradiated with light, conditions become complicated. The magnitude of the current is represented by:

$$I = q\mu N_c(F)V/L + KV^2\theta\mu/4\pi L^3 \tag{2}$$

where q is an electric charge, and $N_c(F)$ is the density of electrons in the conduction band corresponding to the intensity of the incident light when no electric field is applied to the semiconductor.

The first term of formula (2) represents a current which changes depending upon the intensity F of the incident light, and the second term represents SCLC.

That is, the difference between the steady-state current values in the graphs of FIGS. 4A and 4B reflects the difference between the current value represented by the first terms.

As described above, however, in the initial state immediately after voltage application, the value of the second term is so large that the difference between the currents of the first terms due to the difference between the intensities of incident light is difficult to reflect. In other words, it could be considered that immediately after voltage application, the dependency of current upon the light intensity is reduced. As a result, this has caused the conventional image sensors to function erroneously.

As shown FIG. 5, a phenomenon occurs in when a repetition pulse voltage is applied, current I produced 50 μsec after voltage application is decreased depending upon the pulse frequency; especially in the region of somewhat high frequencies, the degree of the dependency of I upon the light intensity is increased. This phenomenon can be understood from the above theory as follows.

When a repetitive pulse voltage having a somewhat high frequency is applied to the semiconductor, electrons do not have enough time to get away from the shallow trap level and therefore remain at that level. Therefore, 9 of the second term of formula (2) is not large enough at the initial state, current I decreases correspondingly, and the current represented by the first term reflects significantly on current I. That is, the difference between the light intensities F reflects on current I.

The features of the transient response of a current after voltage application, such as described above, is considered noticeable in thin film semi-conductors conductors each having many shallow trap levels.

The matrix circuits shown in FIGS. 1 and 2 will be discussed on the basis of the experimental results and theoretical consideration thereon described above.

Figure 2:
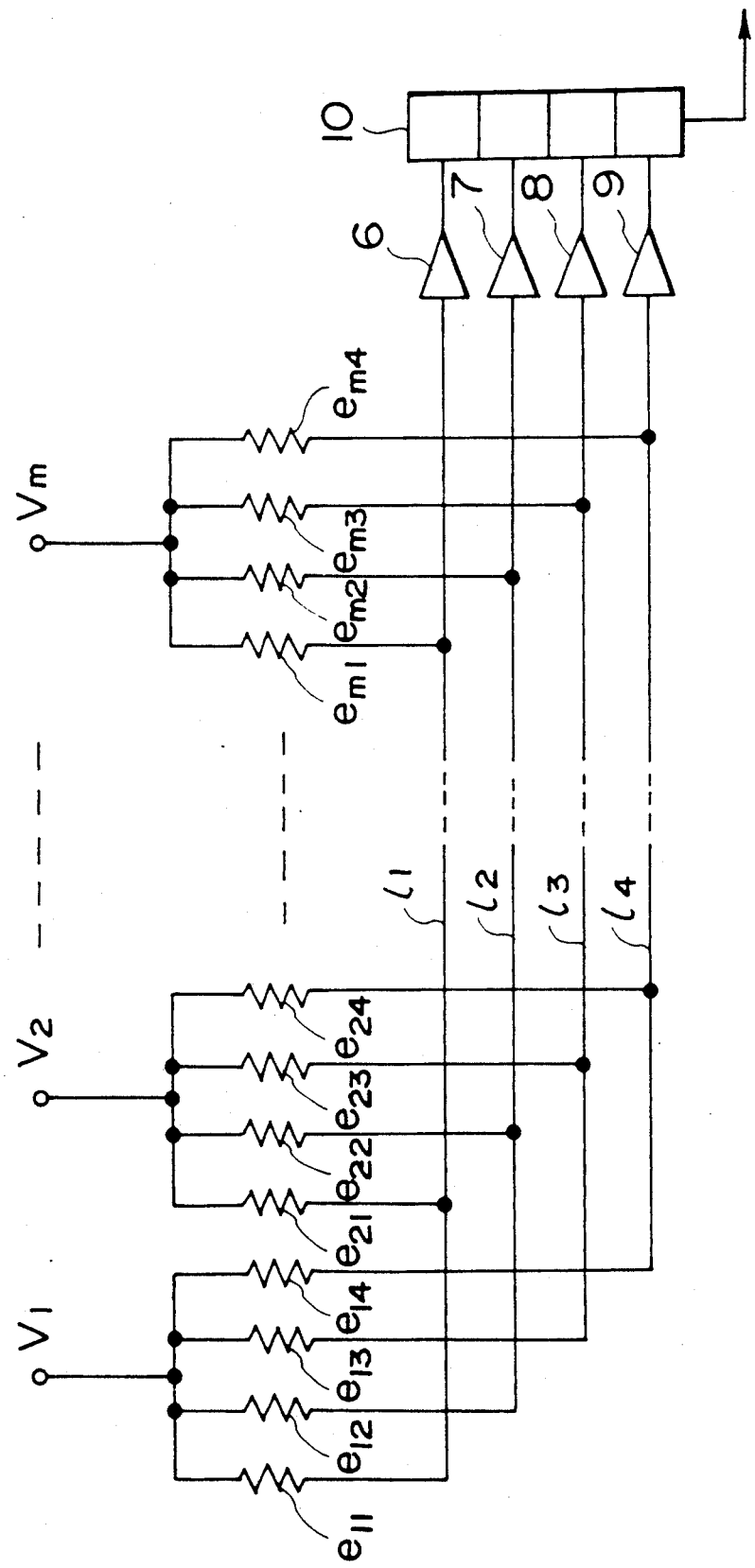
FIG. 2 is a schematic circuit diagram of a second example of the conventional matrix circuit.
Figure 3:
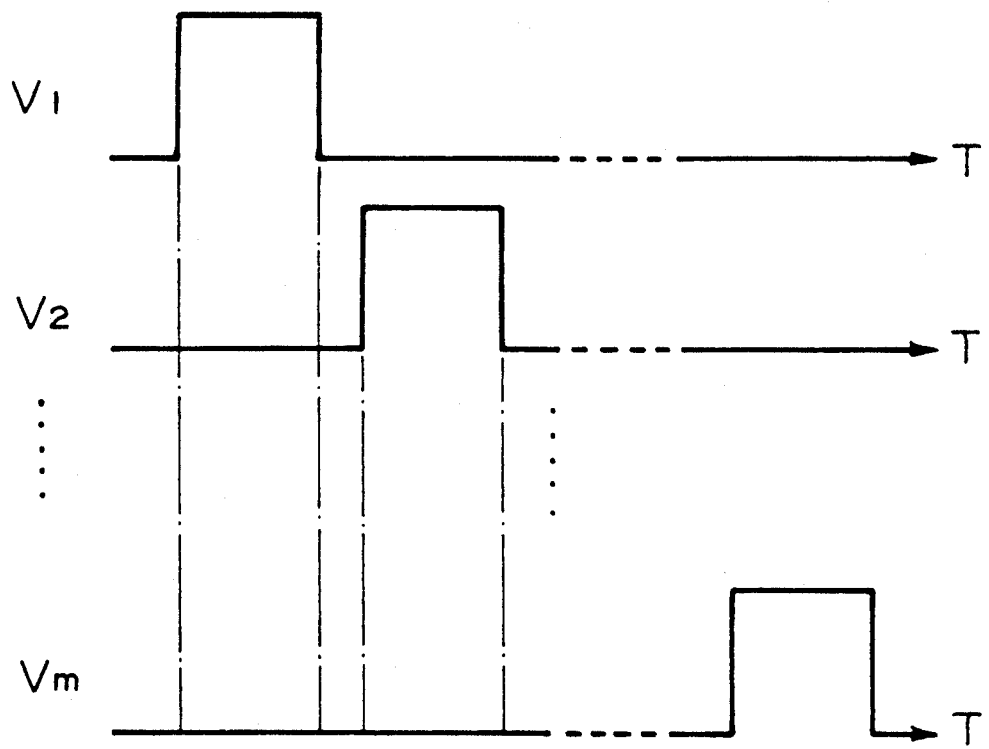
FIG. 3 is a timing chart of timing of applying voltages $V_1-V_m$.

In FIGS. 1 and 2, voltages $V_i$ are applied to the respective blocks with the timing illustrated in FIG. 3 in which it is possible to provide an interval when no blocks become active between intervals when the respective blocks become active because of application of corresponding voltages $V_i$. If voltages are applied to all of the blocks during this interval they will be equal for any block due to the fact that the voltages are impressed with a pulse voltage having a particular period before it would become active normally. The timing chart of these voltages $V_i$ is shown in FIG. 1.

Figure 7:
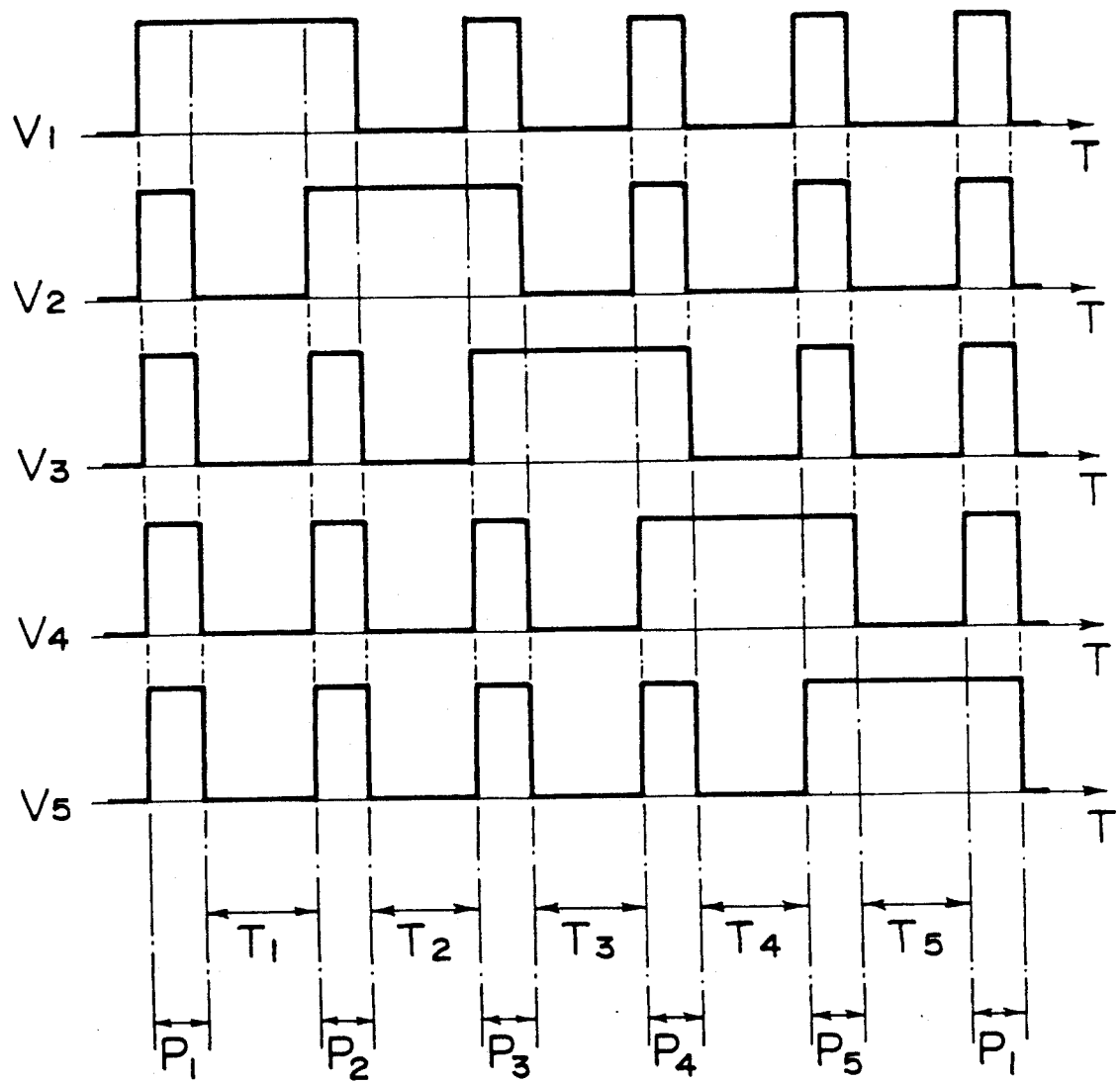
FIG. 7 is a timing chart of the application of a voltage $V_i$ indicating the operation of an embodiment of the present invention.

FIG. 7 is a timing chart of applied voltages $V_i$ ($1 \leq i \leq 5$) when the number of blocks, m=5 in the matrix circuits of FIGS. 1 and 2.

The case of a voltage $V_4$ applied to the 4-th block will be considered. A repetitive pulse voltage has been applied before an interval $T_4$ when the 4-th block becomes active. These repetitive pulse voltages are available by applying voltages $V_1$-$V_5$ to the 4-th block during periods $P_1$-$P_4$ other than intervals $T_1$-$T_3$ when the 1st-3rd blocks become active. This applies in common to all other blocks and is not limited to the 4-th block only.

It has already been described that application of such voltage $V_1$ increases the dependency of a photocurrent flowing through a unit element $e_{ij}$ upon the light intensity.

In the actual operation, however, the percentage of the interval when each block is active, $T_i/(T_i+P_i)$, is preferably large. In other words, the duty factor of a repetitive pulse is preferably small. The maximum of this duty factor is $P_i/(T_i+P_i)$. It will be understood that as shown in FIG. 8, the dependency of current I upon the light intensity is not greatly decreased although the duty factor is decreased. Thus, it is possible to improve the characteristics without lowering the percentage of the active interval. In the graph of FIG. 8, the axis of abscissas represents the duty factor of a repetitive voltage pulse while the axis of ordinates represents the ratio of current $I_p(100)$ at an illuminance of $100(1 \times)$ to $I_p(10)$ at an illuminance of $10(1 \times)$, $(I_p(100)/I_p(10))$.

The present inventors eagerly discussed and studied circuits for realizing the above method. As a result, the inventors have reached preferred embodiments of a circuit structure which will be described below.

Figure 9:
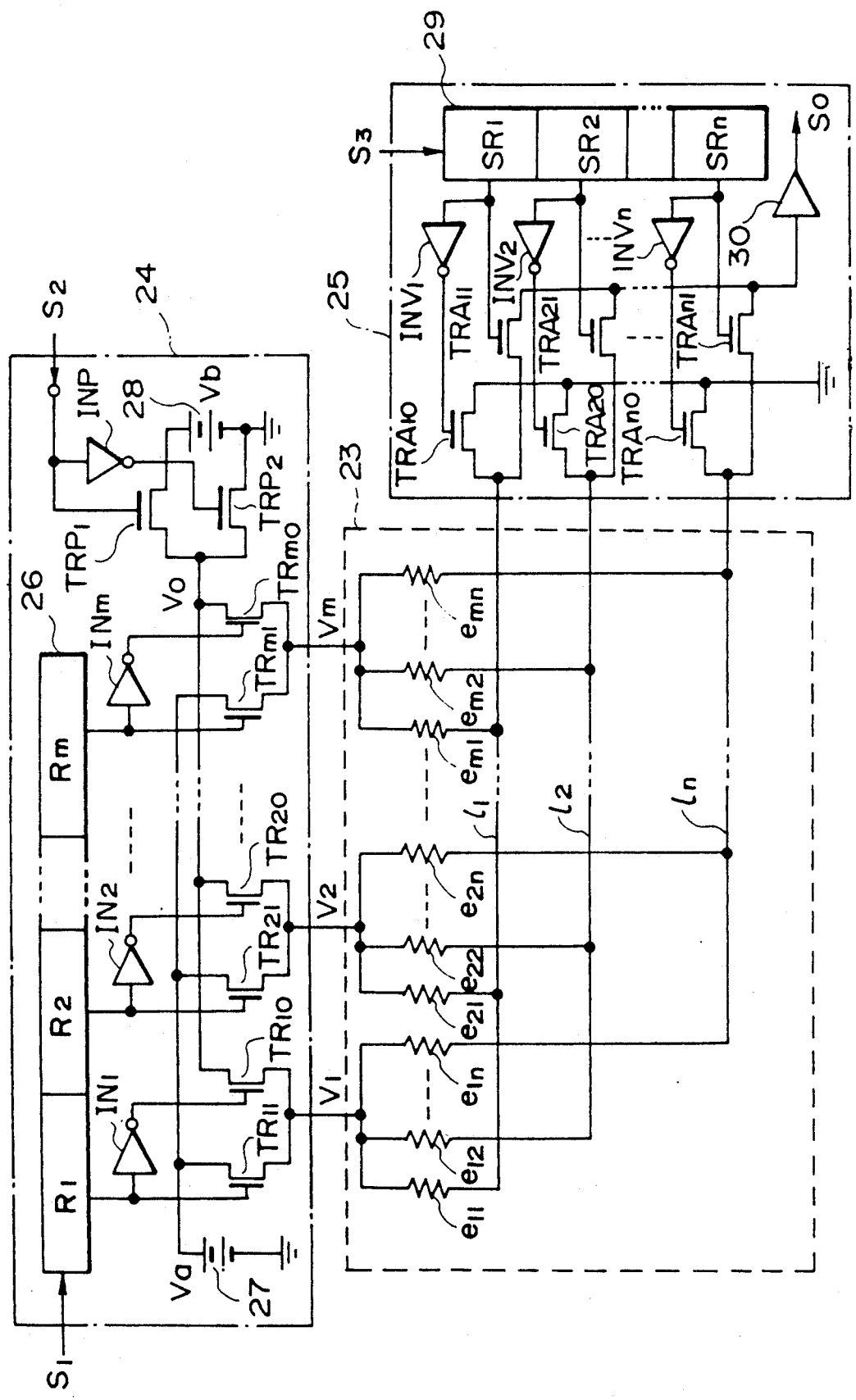
FIG. 9 is a circuit diagram of an embodiment of a matrix circuit according to the present invention.

FIG. 9 is a circuit diagram of an embodiment of a matrix circuit according to the present invention.

In FIG. 9, unit elements $e_{ij}$ each are photoreceptors formed out of a thin film semiconductor. Here, m=64 and n=32.

A matrix section 23 including these unit elements $e_{ij}$ and a multilayered wiring section formed on the same substrate is connected to a common electrode side drive section (referred to as common section hereinafter) 24 which applies voltages $V_i$ to the respective unit elements and to an individual-electrode side drive section 25 (referred to as individual section hereinafter) 23 which receives photocurrents from unit elements for each block and outputs them as a time series signal.

Common section 24 is constituted, as follows.

The parallel terminals $R_i$ ($1 \leq i \leq 64$; this notation applies also to $R_i$ which will appear hereinafter) of a shift register 26 are connected to corresponding input terminals of inverters $IN_i$ and corresponding gate terminals of transistors $TR_{i1}$. The output terminals of inverters $IN_i$ are connected to corresponding gate terminals of transistors $TR_{i0}$. The plus terminal of a DC power source 27 (voltage $V_a$) is connected to the drain terminals of transistors $TR_i$ and the minus terminal is grounded.

On the other hand, the plus terminal of a DC power source 28 (voltage $V_b$) is connected via a transistor $TRP_1$ to the drain terminal of a transistor $TR_{i0}$. The minus terminal of DC power 28 is grounded and also connected via a transistor $TRP_2$ to the drain terminal of transistor $TR_{i0}$. The gate terminal of transistor $TRP_1$ is supplied with a pulse signal $S_2$ while the gate terminal of transistor $TRP_2$ is supplied with pulse signal $S_2$ via inverter INP.

The source terminals of transistors $TR_{i1}$ and $TR_{i0}$ are together connected to corresponding common terminal of unit elements $e_{ij}$ of matrix section 23 and apply a voltage to a corresponding block.

The structure of the individual section 25 will now be described. The drain terminals of transistors $TRA_{j0}$ ($1 \leq j \leq 32$; this notation applies also to $TRA_j$ which will appear hereinafter) are connected to corresponding lines $I_j$ of matrix section 23 and also to the drain terminals of transistors $TRA_{j1}$. The parallel output terminals of a shift register 29 (32 bits here) are connected to corresponding input terminals of inverters $INV_j$ and also to the gate terminals of transistors $TRA_{jl}$. The source terminals of transistors $TRA_{jl}$ are connected to an input terminal of amplifier 30 while the source terminals of transistors $TRA_{j0}$ are grounded.

The operation of this embodiment thus constituted will be described using a timing chart of FIG. 10 where $R_1, R_2, R_3, R_4, \ldots$ represent the output levels at the parallel outputs $R_1, R_2, R_3, R_4, \ldots$ of shift register 26. $V_0$ represents a voltage at the drain terminal of transistor $TR_{i0}$, and $V_1$, $V_2$, ... represent parts of FIG. 7.

Now assume that only the output at one $R_1$ of the parallel output terminals of shift register 26 becomes high. This causes transistor $TR_{11}$ to be turned on and transistor $TR_{10}$ to be turned off. The voltage $V_a$ of DC power source 27 is applied as a voltage $V_1$ to unit elements $e_{11}$-$e_{1n}$ of the first block (this interval is designated $\Delta T$. For example, $\Delta T = 60$ $\mu$sec). During this interval, since pulse signal $S_2$ is at low level, transistor $TRP_2$ is turned on and voltage $V_0$ is at ground level.

After interval $\Delta T$, elapses terminal $R_1$ then becomes low, and after interval $\Delta P$ (for example, 20 $\mu$sec), terminal $R_2$ becomes high. Thus, during interval $\Delta P$, all of the terminals $R_1$-$R_m$ are at a low level, so that transistors $TR_{i1}$ and $TR_{i0}$ are turned off and on, respectively. At the same time, pulse signal $S_2$ becomes high and transistor $TRP_1$ is turned on. Thus, voltage $V_0$ is the voltage $V_b$ of DC power source 28 and voltage $V_1$ applied to the first block becomes voltage $V_a$ during interval $\Delta T$ and $V_b$ during the subsequent interval $\Delta P$. On the other hand, voltage $V_2$, ... $V_m$ applied to other blocks become ground level during interval $\Delta T$ and voltage $V_b$ during the subsequent interval $\Delta P$.

In this manner, applied voltages $V_1$-$V_m$ sequentially become high (voltage $V_a$, then $V_b$) at interval $\Delta T + \Delta P$ (here, 80 $\mu$sec), and thus applied voltages $V_i$ having the timing of FIG. 7 results. Voltage $V_s$ of DC power source 27 and voltage $V_b$ of DC source 28 have the relationship of $V_a = V_b$, or $V_a < V_b$.

On the other hand, individual section 25 supplies photocurrents from unit elements $e_{i1-ein}$ sequentially to amplifier 30 during intervals $\Delta T$ when applied voltage $V_i$ is $V_a$.

Figure 10:
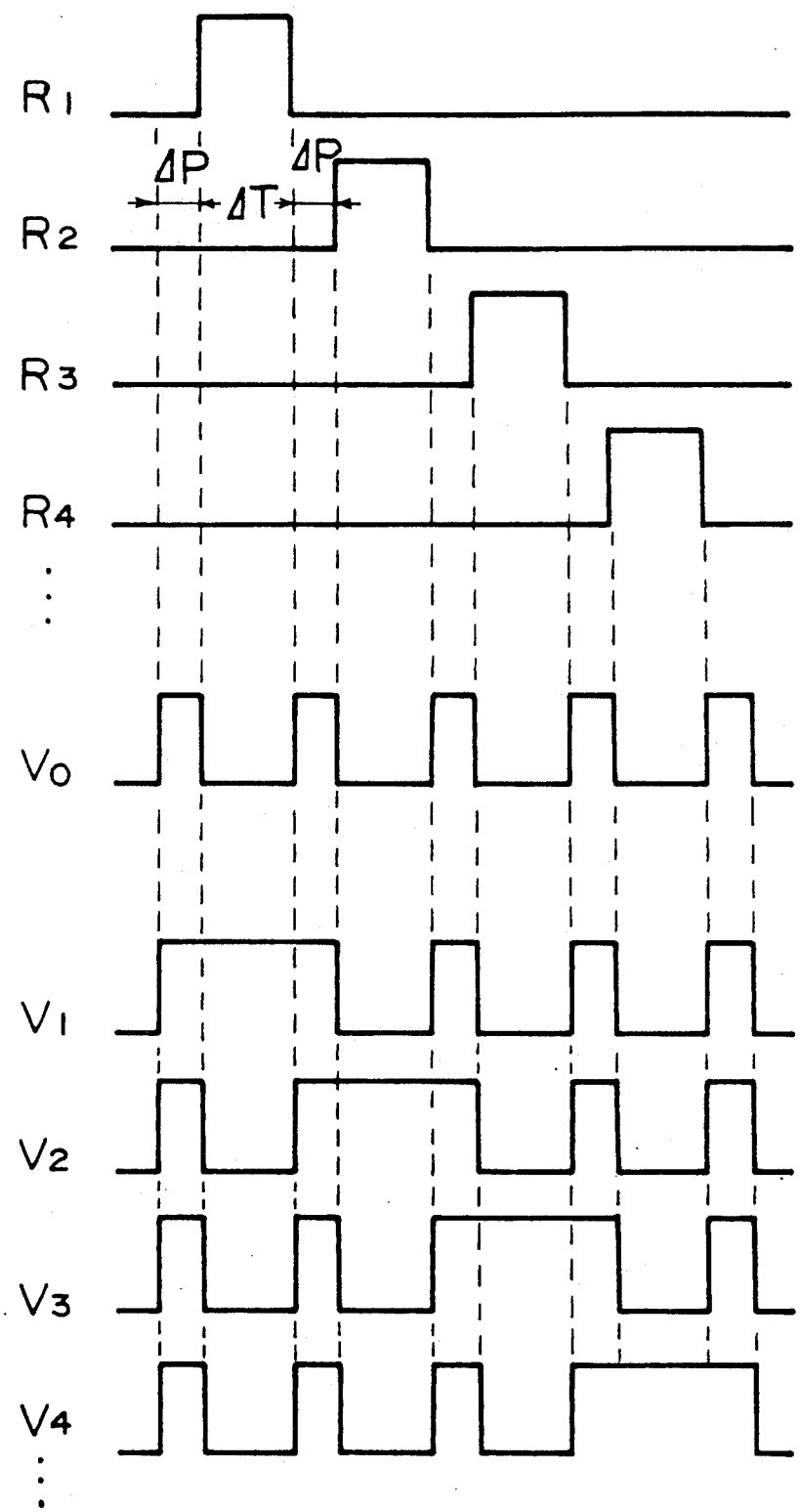
FIG. 10 is a timing chart of the operation of the embodiment.
Figures 11A, 11B:
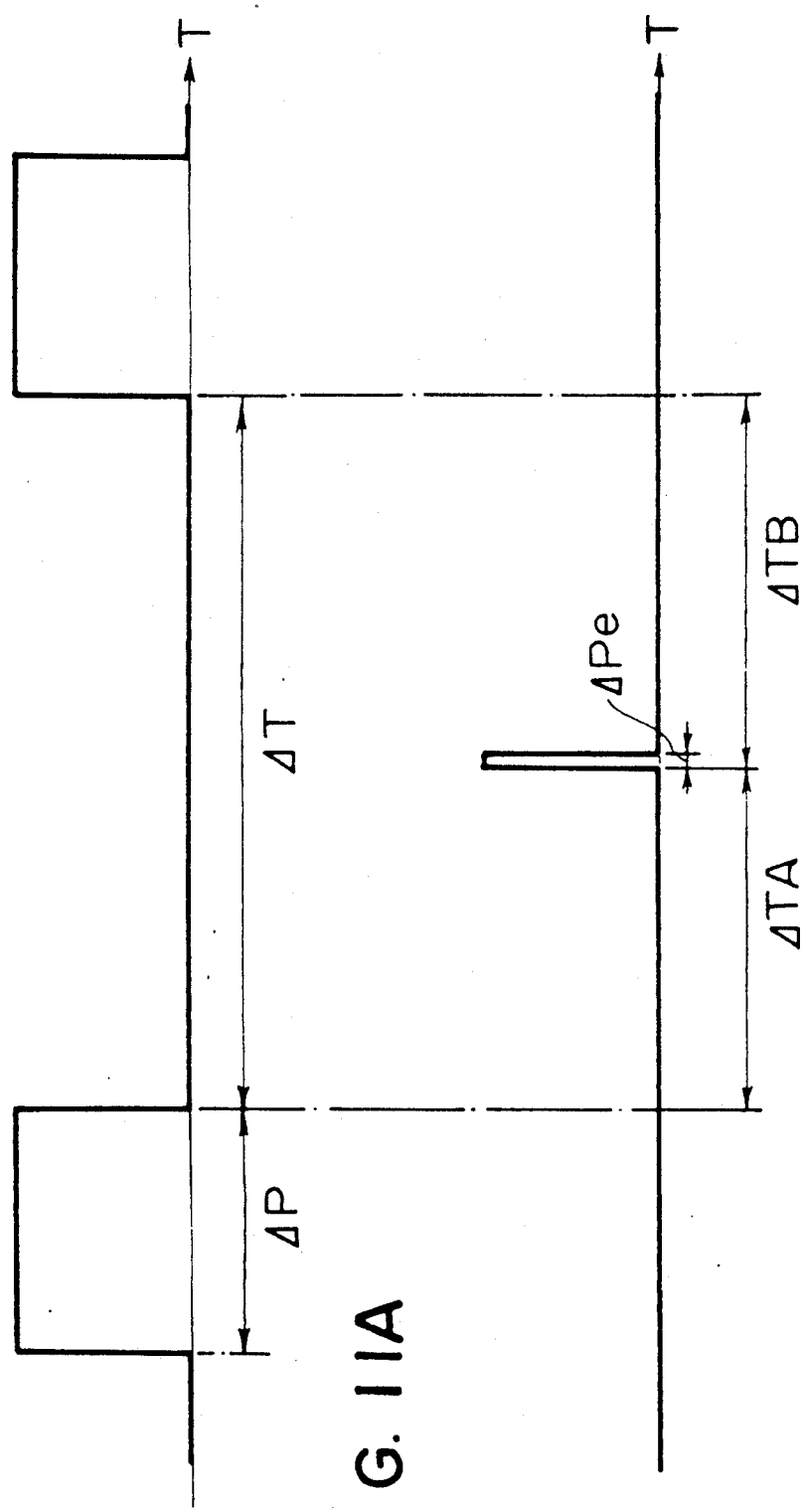
FIG. 11A illustrates a waveform of a pulse signal $S_1$.
FIG. 11B illustrates of a pulse signal $S_2$ at the timing of pulse signal $S_1$.

FIG. 11A represents part of the waveform of voltage $V_O$ in FIG. 10 and FIG. 11B represents an output waveform at one $SR_1$ of the parallel output terminals of shift register 29.

In FIGS. 11A and 11B, when voltage V becomes ground level, i.e. after a time (for example 28 $\mu$sec) elapses corresponding to interval $\Delta T$ from the beginning thereof, the output at the terminal $SR_1$ of shift register 29 becomes high only during interval $\Delta P_e$ (for example 1 $\mu$sec), and transistor $TRA_{11}$ is turned on, thereby allowing photocurrents from unit elements $e_{ii}$ to pass to amplifier 30. Since, at this time, output terminals $SR_2$-$SR_n$ are at low level, transisters $TRA_{20}$ -$TRA_{n0}$ are turned on and unit elements $e_{i2}$-$e_{in}$ are grounded.

In this way, output terminals $SR_2$-$SR_n$ become high sequentially during interval $\Delta TB$ and photocurrents from unit elements $e_{i2}$-$e_{in}$ are input sequentially to amplifier 30, thereby obtaining a time series signal $S_0$.

FIG. 12A represents the output of amplifier 30 derived when a conventional voltage pulse shown in FIG. 3 is applied to the matrix circuit of FIG. 9 (assume that $V_0$ is ground level). FIG. 12B represents the waveform of the output of amplifier 30 when the particular embodiment of the present invention is used. A curve 301 is obtained at an illuminance of 100(1$\times$) while a curve 302 is obtained at an illuminance of 10(1$\times$).

In FIG. 12A, in spite of uniform illuminance, the output signals from the first and last unit elements in the same block differ in magnitude and the ratio of the magnitude of the output signal at an illuminance of 100(1$\times$) to the magnitude of the output signal at luminance of 10(1$\times$) decreases from the first unit element to the last one. In contrast, great improvement is noticed in FIG. 12B.

Figure 13:
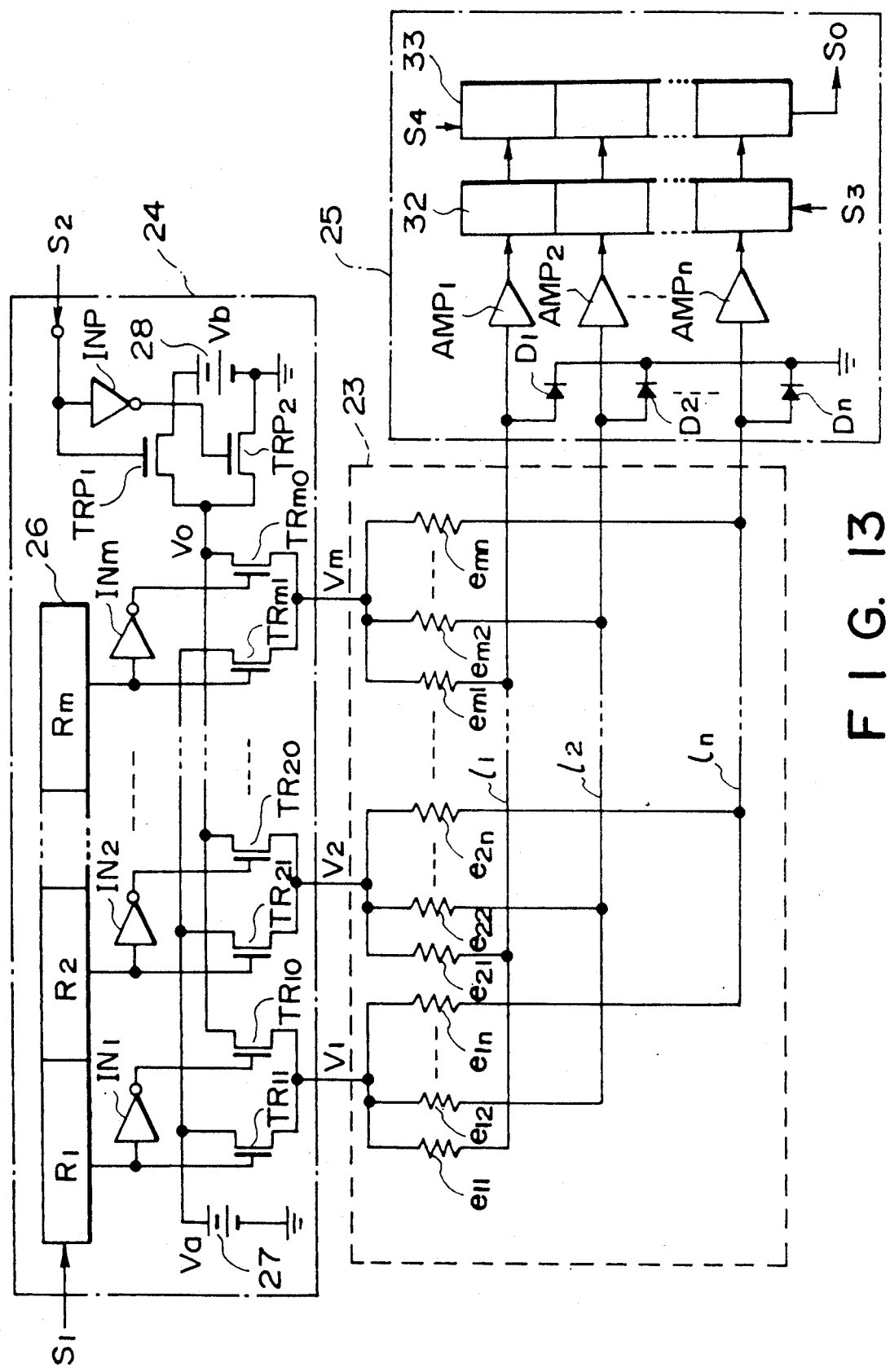
FIG. 13 is a specified structure of another embodiment of the present invention.

FIG. 13 is a circuit diagram of another embodiment of the matrix circuit according to the present invention. In FIG. 13, matrix section 23 and common section 24 are the same as those of FIG. 9, and a pulse signal $S_1$ input to shift register 26 is also the same as that of FIG. 9. Therefore, further description thereof will be omitted and only individual section 25 will be described in more detail.

Schottky diodes $D_n$ ($1 \leq j \leq 32$; this notation applies also to $D_n$ which will appear hereinafter) are connected at one-side terminals to corresponding lines $l_n$ and at the other-side terminals to ground such that when the lines $l_j$ are at high level, these diodes are forwards biased. Lines $l_n$ are further connected to corresponding input terminals of amplifiers $AMP_n$, the output terminals of which are connected via a sample and hold circuit 32 to corresponding parallel input terminals of a shift register 33.

Assume that voltage $V_a$ is applied to the j-th block synchronously with voltage V shown in FIG. 14A. At this time, the photocurrents flowing through unit elements $e_{i1}$-$e_{in}$ are amplified by amplifiers $AMP_i$-$AMP_n$ and then input to sample and hold circuit 32 which, however, does not hold signals from amplifiers $AMP_n$ unless a hold signal $S_3$ shown in FIG. 14B is input thereto.

As shown in FIG. 14B, hold signal $S_3$ is input to sample and hold circuit 32 at a point of time coincident with the end of interval $\Delta T$ whereupon the outputs of amplifiers $AMP_1$-$AMP_n$ are held at sample and hold circuit 32 and then stored by shift register 33 Shift register 33 is then impressed for only interval $\Delta TC$-32 $\mu$sec with a 1-MHz shift pulse such as shown in FIG. 14C, thereby outputting the stored contents as a time series signal $S_0$ from a serial output terminal.

FIG. 15A is a waveform diagram of a time series signal $S_0$ obtained upon application of timing voltages $V_i$ shown in FIG. 3 (assume that V is a ground level) while FIG. 15B is a waveform diagram of a time series S signal obtained by use of the drive method shown in FIG. 7. A curve 34 is obtained at an illuminance of 100(1$\times$) and a curve 35 is obtained at an illuminance of 10(1$\times$).

In the case of the matrix circuit shown in FIG. 13, a signal is extracted at the end of interval $\Delta T$ when a unit element $e_{ij}$ becomes active by the sample and hold circuit. Thus, each of the unit elements are in a stable state and the outputs of the unit elements do not vary from beginning to end. However, as in FIG. 15A, the ratio in magnitude of output signals at illuminances of 100 and 10(1$\times$) remains still small. In contrast, when a drive method according to the present invention is used, the ratio is greatly improved, as shown in FIG. 15B.

While the preferred embodiments of the invention have been described with respect to a strip image sensor as an example, it should be noted that the present invention is not limited to this and can also be applied to a driving of other thin film semiconductor devices.

For example, the present invention is applicable to two-dimensional (thin film semiconductor (TFT) devices utilized in liquid crystal display (LDCs), electrochromic displays (ECDs), etc.

In the present embodiment, since voltages $V_i$ applied to the unit elements during interval $\Delta T$ and voltage $V_0$ applied during interval $\Delta P$ are supplied by two independent power sources (DC power sources 27 and 28), they can easily be set to optimal values. In addition, shift register 26 is simplified in structure and easy to integrate.

As described above in detail, the matrix circuit according to the present invention has a simple structure to improve the efficiency of activity of unit elements of a thin film semiconductor. Thus, erroneous operation is difficult to take place and low cost of matrix circuits is realized.

What we claim is:

1. A matrix circuit comprising:
   a plurality of blocks, each of said blocks
   (i) including a plurality of thin-film semiconductor unit elements that are activated in response to the application of a predetermined voltage thereto, and
   (ii) being arranged such that the predetermined voltage can be applied to each of the elements associated with said block simultaneously;
   drive means for supplying said blocks sequentially with the predetermined voltage and driving the predetermined voltage from a first reference voltage source;
   pulse generating means for generating the predetermined voltage as a pulse, the voltage being derived from a second voltage source, said pulse generating means performing the pulse generating operation independent of said drive means; and
   selective means for supplying the pulse to all of said blocks simultaneously when said drive means does not supply the predetermined voltage to said plurality of blocks sequentially, the pulse supplying being performed in cooperation with said drive means and said pulse generating means.

2. A matrix circuit according to claim 1, wherein each of said plurality of semiconductor unit elements includes a thin film semiconductor.

3. A matrix circuit according to claim 2, wherein said thin film semiconductor is an amorphous silicon hydride.

4. A matrix circuit according to claim 2, wherein said thin film semiconductor is photoconductive.

5. A matrix circuit according to claim 1, wherein each said unit element comprises a photodiode.

6. A matrix circuit according to claim 1, wherein each said unit element comprises a photoconductive photosensor.

7. A matrix circuit according to claim 1, wherein each said unit element comprises a field effect transistor.

8. A matrix circuit according to claim 1, wherein each said unit element comprises a photoreceptor.

9. A photosensor comprising a matrix circuit according to claim 1.

10. A liquid crystal display apparatus comprising a matrix circuit according to claim 1.

* * * * *

UNITED STATES PATENT AND TRADEMARK OFFICE
CERTIFICATE OF CORRECTION

PATENT NO. : 5,043,719

DATED : August 27, 1991

INVENTOR(S) : KATSUMI NAKAGAWA ET AL.   Page 1 of 3

It is certified that error appears in the above-identified patent and that said Letters Patent is hereby corrected as shown below:

COLUMN 1

Line 22, "sulfide" should read --sulfide- --.
Line 45, "Thus" should read --Thus,--.

COLUMN 2

Line 15, "$T_a$-10 msec," should read --$T_a$=10 msec,--.
Line 22, Italics should be deleted
Line 66, "connected" should read --connected to--.

COLUMN 3

Line 27, "$V_i$" should read --$V_i$,--.
Line 31, "repetition" should read --repetitive--.
Line 37, "illustrates of" should read
--illustrates a waveform of--.

COLUMN 4

Line 19, "a" (second occurrence) should read --an-- and
"voltage µ" should read --voltage, µ--.
Line 37, "$C_c$" should read --$N_c$-- and
"compare" should read --compared--.
Line 38, "e" should read --θ--.
Line 43, "falls" should read --fall--.
Line 46, "approaches" should read --approach--.
Line 47, "e" should read --θ--.
Line 58, "$I=qµN_c(F)V/L+KV^2θµ/4τL^3$   (2)" should read
--$I=qµN_c(F)V/L+KV^2θµ/4πL^3$   (2)--.

UNITED STATES PATENT AND TRADEMARK OFFICE
CERTIFICATE OF CORRECTION

PATENT NO. : 5,043,719

DATED : August 27, 1991

INVENTOR(S) : KATSUMI NAKAGAWA ET AL.    Page 2 of 3

It is certified that error appears in the above-identified patent and that said Letters Patent is hereby corrected as shown below:

COLUMN 5

Line 13, "shown" should read --shown in-- and "in" should be deleted.
Line 14, "repetition" should read --repetitive--.
Line 19, "theory" should read --theory,--.
Line 25, "9" should read --$\theta$--.
Line 33, "semi-conductors" should read --semiconductors--.
Line 57, "P1-P4" should read --$P_1$-$P_4$--.

COLUMN 6

Line 25, "23" should be deleted--.
Line 37, "transisters" should read --transistors--.

COLUMN 7

Line 12, "interval $\Delta T$, elapses" should read --interval $\Delta T$ elapses,--.
Line 33, "elements $e_{i1-ein}$" should read --elements $e_{i1}$-$e_{in}$--.
Line 48, "transisters" should read --transistors--.

UNITED STATES PATENT AND TRADEMARK OFFICE
CERTIFICATE OF CORRECTION

PATENT NO. : 5,043,719
DATED : August 27, 1991
INVENTOR(S) : KATSUMI NAKAGAWA ET AL.

It is certified that error appears in the above-identified patent and that said Letters Patent is hereby corrected as shown below:

COLUMN 8

Line 11, "$D_n(1\leq j\leq 32;$" should read --$D_n(1\leq n\leq 32;$--.
Line 15, "$1_j$" should read --$1_n$--.
Line 33, "register 33 Shift" should read --register 33. Shift--.
Line 59, "this" should read --such embodiment--.
Line 62, "(thin" should read --thin--.

Signed and Sealed this

Twenty-second Day of June, 1993

Attest:

MICHAEL K. KIRK

Attesting Officer

Acting Commissioner of Patents and Trademarks